(12) United States Patent
Kuenz

(10) Patent No.: US 7,150,620 B2
(45) Date of Patent: Dec. 19, 2006

(54) MOUNTING FOR THE BLOWING MANDREL ON A BLOW-MOLDING DEVICE

(75) Inventor: Johann Kuenz, Hard (AT)

(73) Assignee: Soplar SA, Alstatten (CH)

( * ) Notice: Subject to any disclaimer, the term of this patent is extended or adjusted under 35 U.S.C. 154(b) by 277 days.

(21) Appl. No.: 10/933,518

(22) Filed: Sep. 3, 2004

(65) Prior Publication Data

US 2005/0233026 A1    Oct. 20, 2005

Related U.S. Application Data

(63) Continuation of application No. PCT/CH03/00106, filed on Feb. 14, 2003.

(30) Foreign Application Priority Data

Mar. 4, 2002   (CH) .................................... 0371/02

(51) Int. Cl.
*B29C 49/58*   (2006.01)
(52) U.S. Cl. ...................... 425/182; 425/535
(58) Field of Classification Search ............... 425/182, 425/535; 65/261; *B29C 49/58*
See application file for complete search history.

(56) References Cited

U.S. PATENT DOCUMENTS 6,238,200 B1    5/2001  Spoetzl 6,936,198 B1 *  8/2005  Duringer .................... 425/535
2003/0011109 A1  1/2003  Düringer

FOREIGN PATENT DOCUMENTS

| CA | 2181782 A | * | 1/1998 |
| DE | 19732905 A1 |  | 2/1999 |
| DE | 19846594 A1 |  | 4/2000 |
| EP | 265713 A | * | 5/1988 |
| JP | 04175142 A | * | 6/1992 |
| WO | WO 01/62472 A1 |  | 8/2001 |

* cited by examiner

Primary Examiner—Robert B. Davis
(74) Attorney, Agent, or Firm—Buchanan, Ingersoll and Rooney, PC

(57) ABSTRACT

The present invention is directed to a blow-molding device in terms of the mounting of its blowing and calibrating mandrels. With exemplary embodiments, the effort and expense for dismantling or changing the position of the blowing mandrels can be simplified. The clamping force for the blowing mandrels can be easily adjustable. In an exemplary embodiment, the relative position in terms of height of the blowing mandrels is not impaired by the clamping.

24 Claims, 3 Drawing Sheets

MOUNTING FOR THE BLOWING MANDREL ON A BLOW-MOLDING DEVICE

CROSS REFERENCE TO RELATED APPLICATIONS

This application claims priority under 35 U.S.C. §119 to Swiss Application 371/02 filed in Switzerland on 4 Mar. 2002, and as a continuation application under 35 U.S.C. §120 to PCT/CH03/00106 filed as an International Application on 14 Feb. 2003 designating the U.S., the entire contents of which are hereby incorporated by reference in their entireties.

BACKGROUND

The invention relates to a mounting for the blowing mandrels of a blow-molding device for producing hollow bodies of thermoplastic.

The usual containers of tin plate or ferrous metal, glass, or even ceramic of the past are increasingly being replaced by plastic containers. Especially for packaging fluid substances, such as beverages, oil, cleaning substances, cosmetics, and so forth, plastic containers are primarily employed. Surely the low weight and lesser costs play a not inconsiderable role in this replacement. The use of recyclable plastic materials and the overall more-favorable total energy balance to produce them also contribute to promoting consumer acceptance of plastic containers and especially plastic bottles.

The production of plastic containers, especially plastic bottles, is typically done by an stretch blow molding process or an extrusion blow molding process. In the stretch blow molding process, a predominantly cylindrical parison, open on one end and produced separately by injection molding, is placed in a blow mold. After that, a blowing mandrel is introduced through the opening into the parison. The heated parison is reshaped by stretching and inflation with overpressure to fit the mold cavity. In the extrusion blow molding process, a single- or multi-layer extruded parison, such as a hose, is placed in a blow mold and inflated by overpressure via a blowing mandrel to fit the mold cavity. Depending on whether the hoselike parison is extruded continuously or is temporarily stored upstream of the tip of the worm or in an extrusion head especially embodied for the purpose and ejected spontaneously, "in batches", into the blow mold cavity, the method is called either a continuous or a discontinuous extrusion blow molding process.

The blow-molding devices employed for this often have multiple-mold tools with a plurality of blow-molding cavities, which make it possible to produce a plurality of plastic containers simultaneously in one operation. Each blow-molding cavity is assigned at least one separate blowing mandrel, which is positionable appropriately for the process.

Hollow plastic bodies such as bottles or canisters, but also industrial parts, in many cases have one or more openings that perform a particular purpose in their later use. Often, such openings are embodied such that they can be closed by suitable closing devices. These may for instance be screw closures or snap closures. An essential demand made of the closing technology is tightness to liquids, gases and solids in powdered or granular form. In plastic packages, the tightness is typically accomplished by creating smooth, dimensionally accurate sealing faces, adapted to one another, in both the hollow body and the closure. It is known that the sealing quality can be improved still further by the choice of the correct combination of materials for the hollow body and the closure.

The production of openings designed in this way can be done simultaneously with the production process of the hollow body, or by mechanical postmachining of the hollow body. The opening for introducing the inflation medium, in most cases compressed air, that generates the overpressure is designed at the outset such that it also meets the demands later made in terms of use of the hollow body. The sealing faces, which may be provided both on the end face and on a cylindrical or conical inner wall of a neck that surrounds the opening, are produced by a so-called calibration process, that is, a dimensional adaptation of a portion of the blowing mandrel, acting as a calibrating device, to the region of the opening in the blow-molding tools and to the predetermined wall thickness of the parison inserted into the blow-molding tools. The blowing and calibration mandrel furthermore has the task of pinching off process-created protruding parts of the parison in the upper peripheral region of the opening, except for a minimal residual thickness of the hollow body, so that they can be stamped out in a deburring process that follows the inflation operation.

For both operations, that is, calibrating the opening and pinching off protruding parts, the blowing and calibrating mandrel should assume a very accurate, replicable position relative to the opening in the blow-molding tool in three planes. In particular, the axis of the blowing and calibrating mandrel should match the axis of the opening to the cavity in the blow-molding tool; the intersecting annular face of the blowing and calibrating mandrel should be parallel to the neck knife face of the blow-molding tool, and the final position in terms of height of the blowing and calibrating mandrel relative to the opening in the blow-molding tool should be at exactly the position at which both the dimensional tolerances of the finished hollow body are maintained, and the pinching off of the protruding parts is assured. In practice, this is attained by setting a mechanical end stop for the blowing and calibrating mandrel. This setting is often done manually, by visual assessment of the pinching operation and dimensional monitoring of the opening of the hollow body on the part of the machine operator. In a single blow molding system that has only one blowing and calibrating mandrel, the two demands in terms of quality with respect to the opening and to the protruding parts can still be met simultaneously relatively simply. In automatic blow molding systems with a plurality of parallel blow-molding tools and blowing and calibrating mandrels assigned to them, however, the setting can be done only with great difficulty and is very time-consuming with a view to the demands of quality in the pinching operation, the individual blowing and calibrating mandrels should all be set to the correct height relative to the openings of the cavities in the blow-molding tools. In this respect it should be taken into account that differences in dimension at the openings of the individual blow-molding tools, which are due to the usual production variations or to wear in any case, make different height adjustments of the blowing and calibrating mandrels necessary. Because of the risk of injury to the machine operator, the components of these multiple automatic blow molding systems that cooperate mechanically with one another are protected by covering devices against unauthorized or unintentional access. However, these structural protective provisions are a hindrance to a practicable capability of setting, which should advantageously be done with the machine running.

From International Patent Disclosure WO 01/62472, it is known for the blowing and calibrating mandrels to be mounted axially freely movably within predeterminable limits. In the operation of jointly positioning the blowing and calibrating mandrels against the blow-molding cavities, the blowing and calibrating mandrels are automatically adjustable in height, within the predeterminable limits relative to their outset position, counter to the resistance of a coupling medium, such as a hydraulic fluid. The result is an automatic self-setting of the blowing mandrels which assures a correct position of the blowing mandrels in terms of height.

For technical reasons involving assembly and for maintenance, the blowing and calibrating mandrels are mounted detachably in the blow-molding device. In a modern system, of the kind described for instance in WO 01/62472, they are fixed in their mountings by mechanical clamping. The clamping force is selected such that the blowing and calibrating mandrels cannot adjust unintentionally as a result of their weight and the dynamic forces involved in the processes of motion. The blowing and calibrating mandrels are prevented from falling out of the blow molding system by means of stops. The mechanical clamping mounting includes a retaining nut with a male thread that can be screwed into a threaded bore in the upper machine part. The retaining nut has a conical face that cooperates with a radially compressible clamping element that has a conical counterpart face. The cooperating conical faces divert the force that results from the tightening moment of the retaining nut and, by the radial narrowing of the clamping element, assure the requisite clamping force. A prestressing element, such as a cup spring, compensates for dimensional tolerances and nonuniformities in the formation of the thread, the threaded bore in the upper machine part, and the retaining nut.

The mechanical clamping mounting offers the capability of warp-free mounting of the blowing and calibrating mandrels and makes it possible to compensate for dimensional tolerances. If individual blowing and calibrating mandrels, or all of them, have to be replaced, or if individual blowing mandrels or all of them are changed in their position, for instance rotated about their longitudinal axis, then the mechanical clamping mounting of each individual blowing mandrel affected must be opened in order to perform the requisite change. After that, each mechanical clamping mounting is closed again and tightened to the requisite extent.

SUMMARY

The present invention is directed to a blow-molding device in terms of the mounting of its blowing and calibrating mandrels. With exemplary embodiments, the effort and expense for dismantling or changing the position of the blowing mandrels can be simplified. The clamping force for the blowing mandrels can be easily adjustable. In exemplary embodiments, the relative position in terms of height of the blowing mandrels is not impaired by the clamping.

An exemplary mounting for the blowing mandrels in a blow-molding device is disclosed. According to exemplary embodiments of the invention, a mounting for the blowing mandrels of a blow-molding device has a lower machine part, in which blow-molding tools with blow-molding cavities are disposed, and an upper machine part, disposed above the lower machine part, in which upper part a number of blowing mandrels are mounted by radial clamping. The blowing mandrels are axially positionable in common toward the blow-molding tools and can be introduced into an opening of the cavities. The mounting of the blowing mandrels is essentially free of axially adjustable mechanical prestressing means and is effected via clamping devices which are actuatable via a common coupling medium.

The central mounting of the blowing and calibrating mandrels via a coupling medium can reduce the effort and expense of maintenance, such as dismantling, or for changing the position of the blowing mandrels. It is no longer necessary to release the mounting of each of the blowing mandrels affected. A central manipulation of the coupling medium suffices to release the mounting of all the blowing mandrels and reactivate it. Because of the central adjustability, the prerequisite for simple alteration of the clamping force for the blowing mandrels is also attained. The coupling medium assures that each blowing mandrel is mounted with essentially the same clamping force. The mounting of the blowing mandrels is effected in general by a variation in the pressure of a coupling medium disposed inside a line system. Prestressing springs, clamping nuts or similar clamping means on each blowing mandrel that are adjustable axially from outside are dispensed with. This also has the advantage that the relative position in terms of height of the blowing mandrels is unimpaired by the clamping.

The coupling medium can be a gaseous or liquid medium. For example, a hydraulic fluid can be employed. Coupling the mountings via a hydraulic fluid enables very simple regulation of the clamping of the blowing mandrels, with the aid of time-tested devices. For the hydraulic fluid, a degassing device can be provided.

In a first variant embodiment of the invention, the clamping devices are radially positionable and are coupled via a coupling medium which is disposed in a bore system in the upper machine part. Each blowing mandrel is clamped by at least one clamping jaw, which is subjected to pressure via the coupling medium and presses the blowing mandrel against a stop. The stop may be a fixed stop. In an advantageous variant embodiment, the stop is radially adjustable. For instance, the stop is formed by an adjusting screw that can be actuated from outside. The adjustability of the stop offers the capability of compensating for production-dictated tolerances. The clamping of the blowing mandrels is effected via as few intermediate stages as possible. As a result, this system reacts very precisely, and a pressure change in the coupling medium is transmitted to the clamping jaws without major delay.

For the securest possible mounting of the blowing mandrels, it proves expedient if each blowing mandrel is mounted by two radial clamping jaws, which are subjected to pressure by the coupling medium, The clamping jaws engage diagonally opposed sides of the circumference of the blowing mandrel. The selected disposition of a plurality of clamping jaws assures centered clamping of the blowing mandrels in the receiving bores. This makes it easier to align the blowing mandrels with the openings in the blow-molding cavities.

The clamping jaws cooperate with adjusting pistons, which are guided displaceably, in direct contact with the coupling medium, in bores in the upper machine part. The clamping jaws can be components of the adjusting pistons. With this construction, the number of required components is reduced. Mechanical transmission and intermediate members can be omitted.

It is true that as a rule, a relatively fast response time to pressure changes in the coupling medium is a goal. So that incidental pressure fluctuations that occur especially in gaseous coupling media can be compensated for, it proves advantageous to provide a reservoir for the coupling medium. In it, control valves cooperate with a central pressure regulator.

In an alternative embodiment of the invention, each clamping device for the blowing mandrels includes one radially compressible clamping element, which cooperates with a punch that is axially positionable pneumatically or hydraulically. An advantageous variant of this embodiment essentially employs elements that are already known from the prior art (such as WO 01/62472) for axial mountings of blowing mandrels. The radially compressible clamping element is embodied as a slit cone, provided with a conical counterpart face, of an elastic, wear-resistant material, such as an industrial plastic. The axially positionable punch has a corresponding counterpart face which cooperates, in the axial positioning, with the conical face. In this advantageous exemplary embodiment, the axially positionable punch replaces the otherwise-required retaining nut that can be screwed into a threaded bore. The conical operative face of the retaining nut is replaced by the conical counterpart face on the pressure piston.

It can be provided that the clamping force for the blowing mandrels be adjusted at each individual blowing mandrel. In an expedient and very simple variant embodiment of the invention, the mounting is provided with means that make it possible to adjust the pressure of the coupling medium inside the bores in the upper machine part centrally. The clamping force can be continuously variable. With this provision, it is possible by simple means to set essentially the same clamping force for all the blowing mandrels. For releasing and replacing the blowing mandrels or changing their position, it suffices to actuate the central adjusting means. The buildup of the clamping is effected analogously, by actuation of the central adjusting means for building up pressure in the coupling medium. For instance, the pressure of the coupling medium can be varied mechanically via an adjusting screw or a pressure piston that is actuatable from outside via a lever or the like, the adjusting screw or pressure piston being provided in a bore segment for the coupling medium. However, pneumatic adjusting means for the pressure piston may also be provided. In the case of a hydraulic coupling medium, a pneumatic-hydraulic hybrid system is formed in this way.

To prevent the pressure with which the clamping devices retain the blowing mandrels from unintentionally becoming excessively high, a pressure limiting device for the coupling medium is advantageously provided. It may for instance be embodied as a pneumatic or hydraulic safety pressure valve or the like.

The clamping force for the blowing mandrels is just large enough that in the positioning of the blowing mandrels toward the blow-molding tools, an axial adjustability of the blowing mandrels within predeterminable limits is assured. The adjustability and height amounts for instance to up to about ±4 mm. It is understood that a greater adjustability may be provided instead. In an expedient variant embodiment of the invention, the axial adjustment in height of the blowing mandrels is effected counter to the resistance of a hydraulic coupling means. The height adjustability of the blowing mandrels among one another is coupled, by providing that the hydraulic coupling means is disposed in a separate, communicating bore system. This enables an automatic alignment of the blowing mandrels with the respective geometric given conditions, and in particular an automatic compensation for tolerances in the spacing from the openings of the blow-molding cavities.

BRIEF DESCRIPTION OF THE DRAWINGS

The invention is described in further detail below in terms of an exemplary embodiment shown in the drawings. The drawings, partly schematically and not to scale, show the following.

DETAILED DESCRIPTION

Figure 1:
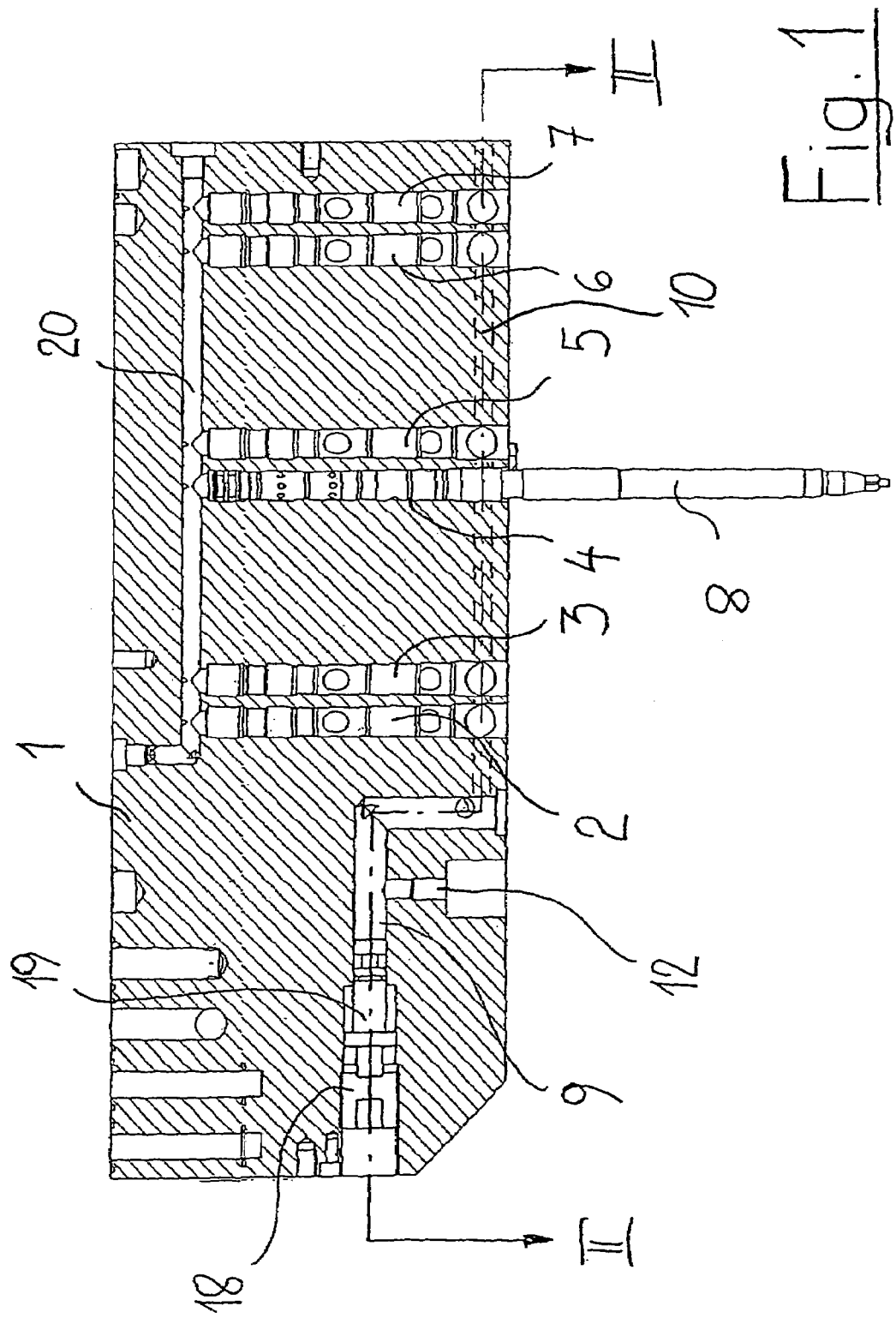
FIG. 1 shows a portion of an exemplary upper machine part with mountings for blowing mandrels, in vertical section.
Figure 2:
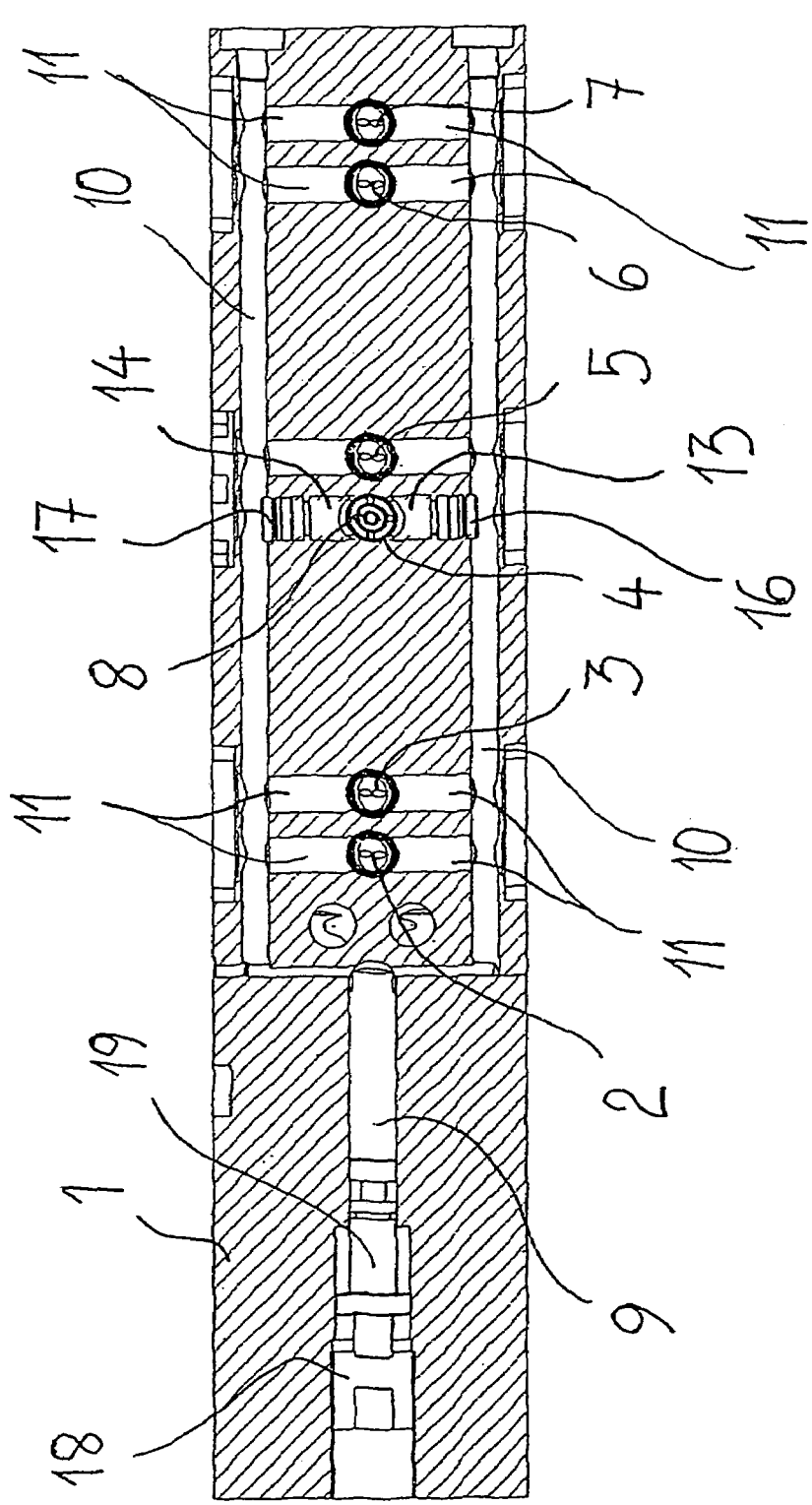
FIG. 2 shows a horizontal section through the exemplary upper machine part, taken along the line II—II in FIG. 1.

The sectional views in FIGS. 1 and 2 show an exemplary upper machine part, identified overall by reference numeral 1, of a blow molding machine for producing hollow bodies, in particular bottles and similar containers provided with an evacuation opening, of thermoplastic. In particular, the apparatus shown as an example is the upper machine part 1 for a blow molding machine for producing dual-chamber containers. To that end, vertically extending receiving bores 2–7 are provided in the upper machine part 1, disposed in pairs side by side and serving to receive the blowing mandrels. In FIGS. 1 and 2, only a single blowing mandrel 8 is shown in each case, mounted in a receiving bore identified by reference numeral 4.

The blow molding machine also includes a table-like lower machine part, not shown in further detail, which is equipped with one or more blow-molding tools. The blow-molding tool or tools are provided with one or more identical cavities, which define the later shape of the hollow body to be made. The cavities open out at the top of the table-like lower machine part, where they have openings that are oriented toward the upper machine part 1. The openings are aligned such that the blowing mandrels 8 protruding from the upper machine part 1 can be introduced in pairs into these openings. It is understood that in the case of a blow molding machine for producing single-chamber containers, only a single blowing mandrel 8 per cavity and opening is provided.

The mounting of the blowing mandrels 8 in the vertically extending receiving bores 2–7 is effected by clamping. FIG. 2 shows two radial clamping jaws 13, 14, which are disposed in bores 11 that extend essentially horizontally to the blowing mandrels 8, and which engage the circumference of the blowing mandrel 8. In particular, the radial clamping jaws 13, 14 are disposed approximately diagonally opposite one another. This makes it easier to produce the radial bores 11 and to center the blowing mandrel 8 that is clamped by the radial clamping jaws 13, 14. The radial clamping jaws 13, 14 for clamping all the blowing mandrels 8 are actuatable via a coupling medium, such as a hydraulic fluid, that is disposed in a cohesive bore system 9, 10. The bore system includes a central supply bore 9 and distributor conduits 10 branching off from it, which communicate with the horizontal bores 11 in which the radial clamping jaws are disposed. Via the coupling medium, the clamping jaws 13, 14 can be positioned radially against the circumference of the blowing mandrels 8. The clamping jaws 13, 14 of all the blowing mandrels 8 are adjusted simultaneously. The clamping jaws 13, 14 are connected to adjusting pistons 16, 17 which are in direct contact with the coupling medium and are displaceable in the horizontal bores 11. The clamping jaws 13, 14 and adjusting pistons 16, 17 can, for example, form a unit.

The pressure of the coupling medium in the bore system 9, 10 can be centrally adjustable. To that end, the supply bore 9 is provided with a female thread in the region of its opening at the upper machine part 1. An adjusting screw 18 provided with a male thread can be screwed variably far into the supply bore. As a result, a pressure piston 19, which is connected to the adjusting screw 18 and is guided in the supply bore 9, is displaced. This makes a very simple, effective, continuously variable adjustment of the pressure of the coupling medium in the bore system 9, 10 possible, and as a result also a continuously variable adjustment of the clamping force of the clamping jaws 13, 14. The pressure of the coupling medium in the bore system 9, 10 can be read off from a nanometer, for instance, which can be mounted in a connection bore 12 (FIG. 1) provided for it on the supply bore 9. For the pressure adjustment, an external actuatable knob with an indexing graduation may also be provided. In the case of a gaseous coupling medium, the bore system 9, 10 in the upper machine part 1 communicates with a reservoir for the coupling medium. In that case, the pressure adjustment can be done centrally and can, for example, be done with automatic regulation.

The clamping force with which the blowing mandrels 8 are mounted by the clamping jaws 13, 14 can be just great enough that upon positioning of the blowing mandrels against the blow-molding tools, an axial adjustability of the blowing mandrels 8 within predeterminable limits is assured. The adjustability in height amounts to up to approximately ±4 mm, for instance. It is understood that a greater adjustability may be provided instead. The axial adjustment in height of the blowing mandrels, in an expedient variant embodiment of the invention, is effected counter to the resistance of a hydraulic coupling means. The adjustment in height of the blowing mandrels 8 among one another is coupled, in that the hydraulic coupling means is disposed in a separate, communicating bore system 20. This enables an automatic alignment of the blowing mandrels 8 with the respective geometric given conditions, and in particular an automatic compensation for tolerances in the spacing from the openings of the blow-molding cavities, as described for instance in WO 01/62472 A1 of the present Applicant, which is hereby expressly incorporated by reference in its entirety, as an example of the adjustability in height of the blowing mandrels 8.

Figure 3:
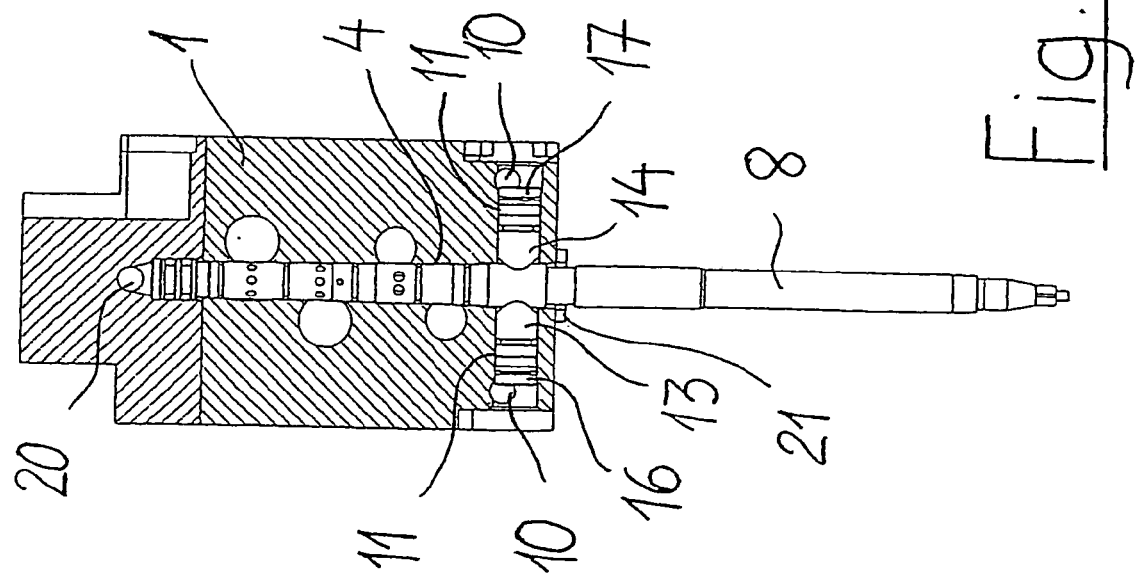
FIG. 3 shows a first exemplary embodiment of a mounting for a blowing mandrel, in vertical section.

FIG. 3, on a larger scale, shows a radial clamping device for a blowing mandrel 8 mounted in a receiving bore 4 in the upper machine part 1. The clamping device includes two clamping jaws 13, 14, which are mounted diametrically opposite one another in radial bores 11 in the upper machine part 1 and rest on the circumference of the blowing mandrel 8. The contact faces of the clamping jaws 13, 14 are advantageously concave and have a curvature which is adapted to the curvature of the circumferential surface of the blowing mandrel 8. The clamping jaws 13, 14 are connected to adjusting pistons 16, 17 which are in direct contact with the (e.g., hydraulic) coupling medium and which seal off the radial bores 11 from the coupling medium. The distributor conduits, by way of which the coupling medium reaches the adjusting pistons 16, 17, are identified by reference numeral 10. Reference numeral 20 designates the separate bore system for the coupled height adjustability of the blowing mandrels 8.

Figure 4:
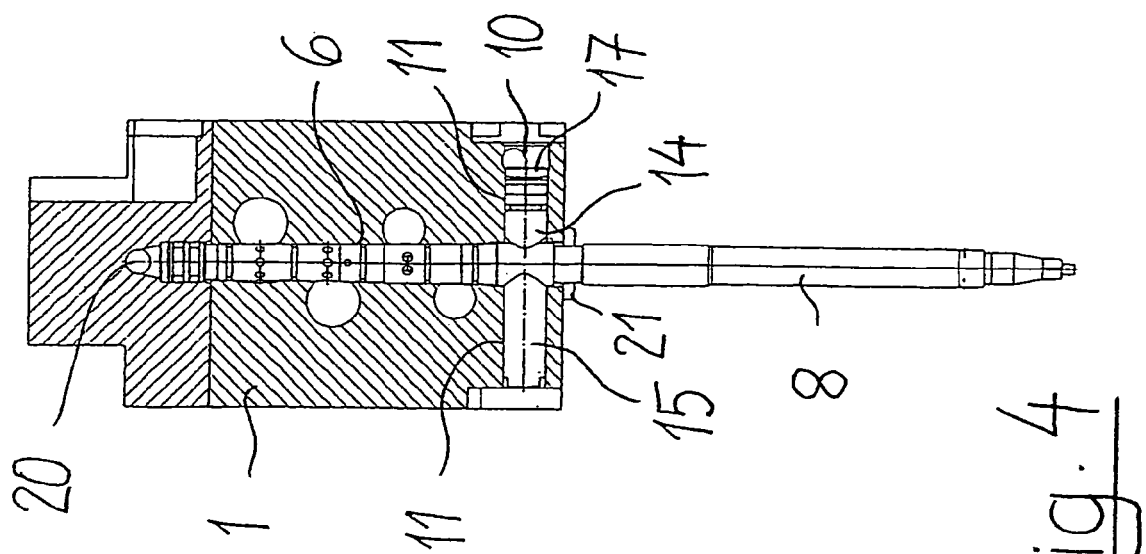
FIG. 4 shows a second exemplary embodiment of the mounting of the blowing mandrel, in a view analogous to FIG. 3.

FIG. 4, in a view analogous to FIG. 3, shows a variant of the invention in which the blowing mandrel 8 is acted upon by a clamping jaw 14 on only one side. On the diametrically opposite side, the circumference of the blowing mandrel 8 contacts a stop 15. The stop 15 may be embodied as a fixed stop, or it may be radially adjustable. For the stop 15, a material can be chosen that has low friction relative to the material comprising the blowing mandrel. This proves advantageous with respect to the wear of the blowing mandrels and the receiving bores. The blowing mandrel 8, mounted for instance in the receiving bore 6 in the upper machine part 1, is clamped between the stop 15 and the clamping jaw 14 that is connected to a adjusting piston 17. The adjusting piston 17 seals off the radial bore 11 from the coupling medium. In this simplified variant embodiment, only one distributor conduit 10 branches off from the central supply bore of the bore system and brings the coupling medium to the clamping jaw 14, which is disposed on one side and has the adjusting piston 17. Once again, reference numeral 20 indicates the separate bore system for the coupled height adjustability of the blowing mandrels 8.

In the assembly process, the blowing mandrels 8 are inserted from below into the vertical receiving bores. Sealing O-rings disposed on the shaft of the blowing mandrels 8 assure auxiliary mounting of the blowing mandrels 8 in the receiving bores. In the pressureless state, the clamping jaws 13, 14 essentially remain in their clamping position and assure additional securing of the blowing mandrels 8 against unintentionally falling out. The clamping force of the clamping jaws 13, 14 in the unloaded state may, however, be overcome very simply by pushing or pulling by hand. Restoring means, such as restoring springs or the like, may also be provided in order to put the clamping jaws 13, 14, in the unloaded state, out of engagement with the circumferential surfaces of the blowing mandrels 8. To prevent the blowing mandrels 8 entirely from falling out, for instance for the eventuality that the coupling medium located in the bore system 9, 10 should suddenly become pressureless, approximately U-shaped flanges 21 may be mounted on the underside of the upper machine part. The flanges 21 engage a narrowed point of the blowing mandrel shaft and serve as a fixed stop.

The central mounting of the blowing mandrels 8 via a coupling medium reduces the effort and expense for maintenance, such as dismantling, or for changing the position of the blowing mandrels 8. It is no longer necessary for the mounting of each of the blowing mandrels 8 affected to be released. A central manipulation of the coupling medium disposed in the cohesive bore system 9, 10 of the upper machine part 1 suffices to release the mounting of all the blowing mandrels 8 or to reactivate it. It may possibly also be necessary to remove fixed stops to enable the blowing mandrels to be pulled out. Because of the central adjustability, the prerequisite for simple variation of the clamping force for the blowing mandrels 8 also exists. Because of the coupling medium and of the practically identical embodiment of the bores, it is assured that each blowing mandrel 8 is mounted with essentially the same clamping force. The mounting of the blowing mandrels 8 is effected by a variation in pressure of the coupling medium disposed inside the bore system 9, 10 of the upper machine part 1. Clamping nuts or similar clamping means on each blowing mandrel 8 that are axially adjustable from outside are dispensed with. This also has the advantage that the clamping of the blowing mandrels 8 does not impair their relative position in terms of height. The coupling medium may be a gaseous or liquid medium. A hydraulic fluid can, for example, be employed.

Coupling the mountings via a hydraulic fluid enables very simple regulation of the clamping of the blowing mandrels 8 with the aid of time-tested devices. For the hydraulic fluid, a degassing device can be provided.

In an alternative embodiment, each clamping device for the blowing mandrels includes one radially compressible clamping element, which cooperates with a pneumatically or hydraulically axially positionable punch. An advantageous exemplary variant of this embodiment essentially uses elements that are already known for axial mountings from the prior art (such as WO 01/62472). The radially compressible clamping element is embodied as a slit cone, provided with a conical counterpart face, of an elastic, wear-resistant material, such as an industrial plastic. The axially positionable punch has a corresponding counterpart face which cooperates, in the axial positioning, with the conical face. In this advantageous exemplary embodiment, the axially positionable punch replaces the otherwise-required retaining nut that can be screwed into a threaded bore. The conical operative surface of the retaining nut is replaced by the conical counterpart face on the pressure piston.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A mounting for the blowing mandrels of a blow-molding device, comprising:
   a lower machine part, in which blow-molding tools with blow-molding cavities are disposed; and
   an upper machine part, disposed above the lower machine part, in which upper part a number of blowing mandrels are mounted by radial clamping, the blowing mandrels being axially positionable in common toward the blow-molding tools and configured for introduction into an opening of the cavities, wherein a mounting of the blowing mandrels includes clamping devices which are actuatable via a common coupling medium and is essentially free of axially adjustable mechanical pre-stressing means.

2. The mount of claim 1, wherein the coupling medium is a gaseous or liquid medium.

3. The mount of claim 1, wherein the clamping devices are essentially radially positionable, and the coupling medium is disposed in a cohesive bore system of the upper machine part.

4. The mount of claim 1, wherein each blowing mandrel is clamped by at least one radial clamping jaw, which is subjected to pressure via the coupling medium and presses the blowing mandrel against an opposite stop.

5. The mount of claim 4, wherein the stop is radially adjustable.

6. The mount of one of claim 1, wherein each blowing mandrel is mounted by two radial clamping jaws, which are subjected to pressure by the coupling medium and are disposed on sides of the circumference of the blowing mandrel.

7. The mount of claim 6, wherein the radial clamping jaws cooperate with adjusting pistons, which are guided displaceably, in direct contact with the coupling medium, in bores in the upper machine part.

8. The mount of claim 1, comprising:
   a reservoir for the coupling medium.

9. The mount of claim 7, wherein the pressure of the coupling medium inside the bores in the upper machine part is centrally adjustable.

10. The mount of claim 9, wherein the pressure of the coupling medium is variable via a pressure piston, which is actuatable mechanically via at least one of an adjusting screw, a lever and pneumatically.

11. The mount of claim 1, wherein each clamping device for the blowing mandrels includes one radially compressible clamping element, which cooperates with a punch that is axially positionable pneumatically or hydraulically.

12. The mount of claim 11, wherein each radially compressible clamping element is embodied as a slit cone, provided with a conical counterpart face, of an elastic, wear-resistant material, and the axially positionable punch has a corresponding counterpart face which cooperates, in the axial positioning, with the conical face.

13. The mount of one claim 1, comprising:
   a pressure limiting device for the coupling medium.

14. The mount of claim 1, wherein the clamping of the blowing mandrels is effected with a clamping force which is just large enough that in positioning of the blowing mandrels toward the blow-molding tools, an axial adjustability of the blowing mandrels within predeterminable limits is assured.

15. The mount of claim 14, wherein the axial adjustment in height of the blowing mandrels is effected counter to a resistance of a coupling means, by way of which the height adjustability of the blowing mandrels among one another is coupled.

16. The mount of claim 2, wherein the coupling medium is a hydraulic fluid.

17. The mount of claim 6, wherein the two radial clamping jaws are disposed on diagonally opposed sides of the circumference of the blowing mandrel.

18. The mount of claim 9, wherein the pressure of the coupling medium inside of bores in the upper machine part is continuously variable.

19. The mount of claim 12, wherein the material is an industrial plastic.

20. The mount of claim 15, wherein the coupling means is hydraulic.

21. The mount of claim 2, wherein the clamping devices are essentially radially positionable, and the coupling medium is disposed in a cohesive bore system of the upper machine part.

22. The mount of claim 21, wherein each blowing mandrel is clamped by at least one radial clamping jaw, which is subjected to pressure via the coupling medium and presses the blowing mandrel against an opposite stop.

23. The mount of one of claim 21, wherein each blowing mandrel is mounted by two radial clamping jaws, which are subjected to pressure by the coupling medium and are disposed on sides of a circumference of the blowing mandrel.

24. The mount of claim 2, wherein each clamping device for the blowing mandrels includes one radially compressible clamping element, which cooperates with a punch that is axially positionable pneumatically or hydraulically.

* * * * *